United States Patent [19]

Bier et al.

[11] 4,136,089

[45] Jan. 23, 1979

[54] MOLDED ARTICLES OF CRYSTALLINE POLY (ETHYLENE/ALKYLENE) TEREPHTHALATES WHICH CRYSTALLIZE RAPIDLY

[75] Inventors: Peter Bier; Rudolf Binsack; Hugo Vernaleken, all of Krefeld, Germany

[73] Assignee: Bayer Aktiengesellschaft, Leverkusen, Germany

[21] Appl. No.: 825,121

[22] Filed: Aug. 16, 1977

Related U.S. Application Data

[63] Continuation-in-part of Ser. No. 658,816, Feb. 17, 1976, Pat. No. 4,086,212.

[30] Foreign Application Priority Data

Feb. 22, 1975 [DE] Fed. Rep. of Germany ....... 2507674

[51] Int. Cl.$^2$ ............................................. C08G 63/18

[52] U.S. Cl. ............................ 528/309; 260/45.7 P; 260/45.75 B; 260/45.75 C; 260/45.9 R; 260/45.95 H

[58] Field of Search ...................................... 260/75 R

[56] References Cited

U.S. PATENT DOCUMENTS

| 3,592,876 | 7/1971 | Brinkmann et al. ........... 260/75 R X |
| 3,714,126 | 1/1973 | Reid .................... 260/75 R |

FOREIGN PATENT DOCUMENTS 1268442  3/1972  United Kingdom ................. 260/75 R Primary Examiner—Lucille M. Phynes
Attorney, Agent, or Firm—Gene Harsh; Lawrence S. Pope

[57] ABSTRACT

Terephthalic copolyesters, the diol component of which consists of ethylene glycol and 2.2-diethyl propane-1.3-diol crystallize more rapidly than pure polyethylene terephthalate and can be molded in a way comparable to butylene terephthalate.

1 Claim, No Drawings

MOLDED ARTICLES OF CRYSTALLINE POLY (ETHYLENE/ALKYLENE) TEREPHTHALATES WHICH CRYSTALLIZE RAPIDLY

This application is a continuation-in-part application of our application Ser. No. 658,816, filed Feb. 17, 1976 now U.S. Pat. No. 4,086,212 granted Apr. 25, 1978.

The present invention relates to molded articles of highly crystalline, thermoplastic copolyesters which crystallize rapidly and which are based on terephthalic acid radicals, ethylene glycol radicals and 2.2-diethyl propane-1.3-diol radicals.

Polyalkylene terephthalates have achieved considerable importance as raw materials for the preparation of fibres, films and moldings. By reason of their partially crystalline structure, they possess outstanding properties, such as high wear resistance, favorable crrep erties and high dimensional accuracy, and are therefore particularly suitable for the production of moldings which are subjected to severe mechanical stress and exposed to severe heat. An additional improvement in the mechanical properties can be achieved by the incorporation of reinforcing materials, for example glass fibres (GB Patent Specification No. 1,111,012, U.S. Patent Specification No. 3,368,995 and DT-AS(German Published Specification) No. 2,042,447).

Because of its particular physical properties, polyethylene terephthalate is suitable especially for the production of fibre products and films. However, for the preparation of moldings, the necessity for high mold temperatures (about 140° C.), and relatively long pressing times is a disadvantage which is only partially compensated by exceptional rigidity and a high heat distortion point.

Although polypropylene terephthalate and polybutylene terephthalate require shorter pressing times and lower mold temperatures (about 100° C.) than polyethylene terephthalate, since they crystallize considerably more rapidly, they have poorer physical properties, in particular a lower heat distortion point, compared with polyethylene terephthalate.

There has been no lack of attempts to provide polycondensates in which the good properties of both polyethylene terephthalate and polypropylene terephthalate or polybutylene terephthalate are combined. Thus it is known, for example, that the tendency of polyethylene terephthalate to crystallize can be improved by nucleation with suitable nucleating agents and/or by increasing the rate of diffusion within the melt by adding lubricants (compare K.-D. Asmus in Kunststoff-Handbuch (Plastics Handbook) volume VIII, "Polyester" ("Polyesters"), page 697 et seq., Carl Hanser Verlag, Munich 1973). However, these measures are not suitable for increasing the rate of crystallization of polyethylene terephthalate to such an extent that it can be processed at low mold temperatures and short molding times similar to those used in the case of polybutylene terephthalate.

It is known from DT-OS(German Published Specification) No. 2,349,396 that it is possible to blend polybutylene terephthalate with polyethylene terephthalate or to replace 1 - 20 mol% of the butane-1,4-diol units of the polybutylene terephthalate by ethylene glycol units without a substantial reduction, or even with an increase, in the rate of crystallization. This result would be the more surprising since it is known that the rate of crystallization is reduced with linear polyesters are modified by codiols (compare R. E. Wilfong, J. Polym. Sci. 54, 385 (1961); L. Mandelkern, "Crystallization of Polymers", McGraw-Hill Inc., New York 1964; P. I. Flory, Trans. Faraday Soc. 51, 848 (1955); and R. K. Eby, J. Appl. Physics 34, 2442 (1963)); however, we were not able to reproduce the results of DT-OS 2,349,396 by experimental checking. Accordingly, in agreement with generally accepted teaching, it appeared to be impossible to improve the rate of crystallization of linear polyesters by incorporating comonomers. As is known, codiols with one or more branch points, which display a marked crystallization-inhibiting effect, such as, for example, 2-substituted propane-1,3-diols (compare GB Patent Specification No. 1,268,442) are used to prepare amorphous polycondensates.

It has now been found, surprisingly, that the tendency of polyethylene terephthalates to crystallize is not reduced by modification with 2.2-diethyl propane-1.3-diol radicals but, on the contrary, is distinctly increased so that the polyethylene terephthalates modified according to the invention have a rate of crystallization comparable to that of polybutylene terephthalate.

The subject of the present invention are, then, molded articles of highly crystalline, thermoplastic terephthalic acid copolyesters which crystallize rapidly and which consist of at least 90 mol %, relative to the dicarboxylic acid component, of terephthalic acid radicals, 95.2 to 99.5 mol %, relative to the diol component, of ethylene glycol radicals and 0.5 to 4.8 mol %, relative to the diol component, of 2.2-diethyl propane-1.3-diol radicals.

The polycondensates according to the invention crystallize considerably more rapidly than pure polyethylene terephthalate and possess a very high melting point, that is to say a combination of properties which is highly desirable and which has not been achieved by the terephthalic acid esters known hitherto.

In addition to terephthalic acid radicals, the polyesters according to the invention can contain up to 10 mol %, relative to the acid component, of radicals of other aromatic or aliphatic dicarboxylic acids such as, for example, phthalic acid, isophthalic acid, naphthalene-2,6-dicarboxylic acid, diphenyl-4,4'-dicarboxylic acid, adipic acid, sebacic acid and cyclohexanediacetic acid.

The copolyesters according to the invention can be prepared in a manner which is in itself known by esterifying or transesterifying the dicarboxylic acids, preferably pure terephthalic acids, and/or the corresponding dimethyl esters with 1.05–2.4, preferably 1.1–1.4 mols of the diols, based on 1 mol of dicarboxylic acid component, in the presence of esterification and/or transesterification catalysts, at between 150 and 250° C. (reaction step A) and polycondensing the reaction products, thus obtained, under customary conditions, that is to say in the presence of esterification catalysts at between 200 and 300° C. under reduced pressure (< 1 mm Hg) (reaction step B).

A particularly preferred embodiment is to mix the codiol into the reaction mixture as late as possible, that is to say only after the reaction of terephthalic acid or of its ester-forming derivatives with ethylene glycol to give bis(2-hydroxy-ethyl) terephthalate has taken place or, even more advantageously, only after formation of a polyethylene terephthalate prepolymer with a degree of polycondensation of more than 4. The mixture can then be polycondensed in the customary manner, as described above.

Both the first (A) and the second (B) step of the condensation are carried out in the presence of catalysts, such as are described, for example, by R. E. Wilfong in J. Polym. Sci. 54, 385 (1961). Some of these catalysts are more active as accelerators for the esterification reaction A and others are more active for the polycondensation B, whilst others again are fairly active catalysts for both reactions (C).

Catalysts which are suitable for accelerating the first reaction stage (A) include
1. lithium, sodium, potassium, calcium, strontium and boron as metals, oxides, hydrides, formates, acetates, alcoholates or glycolates;
2. the chlorides and bromides of calcium and strontium;
3. tertiary amines;
4. the malonates, adipates, benzoates and the like of calcium and strontium; and
5. lithium salts of dithiocarbamic acids.

Suitable catalysts (B) for catalysis of the polycondensation step are, for example,
1. molybdenum, germanium, lead, tin and antimoony as metals, oxides, hydrides, formates, alcoholates or glycolates;
2. the perborates and borates of zinc and lead;
3. the succinates, butyrates, adipates or enolates of a diketone of zinc, manganese-II, cobalt, magnesium, chromium, iron and cadmium;
4. zinc chloride and zinc bromide;
5. lanthanum dioxide and lanthanum titanate;
6. neodymium chloride;
7. mixed salts of antimony, such as, for example, potassium antimony tartrate, and salts of antimonic acids, such as potassium pyroantimonate;
8. zinc or manganese salts of dithiocarbamic acids;
9. cobalt naphthenate;
10. titanium tetrafluoride or titanium tetrachloride;
11. alkyl ortho-titanate;
12. titanium tetrachloride-ether complexes;
13. quaternary ammonium salts which carry a titanium-hexaalkoxy radical; titanium tetraalkoxides, and alkali metal or alkaline earth metal compounds of the alkoxides of aluminium, zirconium or titanium;
14. organic quaternary ammonium, sulphonium, phosphonium and oxonium hydroxides and salts;
15. barium malonate, barium adipate, barium benzoate and the like;
16. the lead, zinc, cadmium or manganese salts of the monoalkyl ester of a phenylenedicarboxylic acid;
17. antimony-catechol complexes with an aminoalcohol or with an amine and an alcohol; and
18. uranium trioxide, uranium tetrahalide, uranium nitrate, uranium sulphate and uranium acetate.

Suitable catalysts C for accelerating both reaction steps are, for example,
1. barium, magnesium, zinc, cadmium, aluminium, manganese and cobalt as metals, oxides, hydrides, formates, alcoholates, glycolates and preferably acetates;
2. aluminium chloride and aluminium bromide;
3. the succinates, butyrates, adipates or enolates of a diketone of zinc, manganese-II, cobalt, magnesium, chromium, iron and cadmium.

Compounds which are most suitable as catalysts A are boric acid, boric acid anhydride and borates, but especially sodium acetate.

The most suitable catalysts B are the compounds of zinc, manganese, cobalt, antimony, germanium, titanium and tin, such as, for example, zinc acetate and manganese acetate, antimony trioxide, antimony trichloride and antimony triacetate, germanium dioxide and germanium tetrachloride and especially titanium compounds, for example tetraalkyl titanic acid esters with alkyl groups with 1–10° C. atoms, such as tetraisopropyl titanate and tetrabutyl titanate.

The catalysts are employed in amounts of 0.001 to 0.2% by weight, relative to the dicarboxylic acid component (referring to the sum of catalysts A and B).

Thereafter inhibitors, such as are described, for example, by H. Ludewig, Polyesterfasern (Polyester Fibres) 2nd edition, Akademie-Verlag, Berlin 1974 are added in order to inhibit the catalysts after the first reaction step is complete and in order to increase the stability of the end product. Examples of such inhibitors are phosphoric acid, phosphorous acid and the aliphatic, aromatic or araliphatic esters thereof, for example alkyl esters with 6 to 18 C atoms in the alcohol component or phenyl esters, the phenyl radicals of which are optionally substituted by 1–3 substituents with 6 to 18 C atoms, such as trinonylphenyl phosphate, dodecylphenyl phosphate or triphenyl phosphate. These inhibitors are usually employed in amounts of 0.01 to 0.6% by weight, relative to the dicarboxylic acid component.

The copolyesters according to the invention should comprise polyesters having a reduced specific viscosity (measured on a 1% strength by weight solution in phenol/tetrachloroethane, 60 : 40, at 25° C.) of between 0.6 and 2.4 dl/g, preferably between 1.0 and 1.7 dl/g. To prepare polyesters with high reduced specific viscosities, the polyesters obtained by the melt condensation process can be subjected to further condensation in solid phase in a known manner.

For protection against thermo-oxidative degradation, the customary amounts of stabilizers, preferably 0.001 to 0.5% by weight, relative to the unfilled and un-reinforced copolyesters, can be added to the copolyesters according to the invention. Examples of suitable stabilizers are phenols and phenol derivatives, preferably sterically hindered phenols which contain alkyl substituents with 1–6 C atoms in the two positions ortho to the phenolic hydroxyl group, amines, preferably secondary arylamines and their derivatives, phosphates and phosphites, preferably the aryl derivatives thereof, quinones, copper salts of organic acids and compounds obtained from the addition reaction of copper-I halides with phosphites, such as, for example, 4,4'-bis-(2,6-di-tert.-butylphenol), 1,3,5-trimethyl-2,4,6-tris-(3,5-di-tert.-butyl-4-hydroxybenzyl)-benzene, 4,4'-butylidene-bis-(6-tert.-butyl-m-cresol), 3,5-di-tert.-butyl-4-hydroxy-benzyl-phosphonic acid diethyl ester, N,N'-bis-(β-naphthyl)-p-phenylenediamine, N,N'-bis-(1-methylheptyl)-p-phenylenediamine, phenyl-β-naphthylamine, 4,4'-bis-(α,α-dimethylbenzyl)-diphenylamine, 1,3,5-tris-(3,5-di-tert.-butyl-4-hydroxy-hydrocinnamoyl)-hexanhydro-s-triazine, hydroquinone, p-benzoquinone, toluhydroquinone, p-tert.-butylpyrocatechol, chloranil, naphthoquinone, copper naphthenate, copper octoate, Cu-(I)Cl/triphenyl phosphite, Cu(I)Cl/trimethyl phosphite, Cu(I)Cl/trischloroethyl phosphite, Cu(I)Cl/tripropyl phosphite and p-nitrosodimethylaniline.

The flame-retarding additives which can be used for the copolyesters according to the invention comprise a large number of chemical compounds which are well known to those skilled in the art. In general, they contain chemical elements which are used because of their flame-retarding capacity, for example bromine, chlorine, antimony, phosphorus and nitrogen. Preferably, the flame-retarding additives consist of halogenated organic compounds (brominated or chlorinated), optionally as a mixture with organic or inorganic antimony compounds, for example antimony trioxide; of elementary phosphorus or phosphorus compounds or of halogen-containing compounds as a mixture with phosphorus compounds or compounds which contain phosphorus-nitrogen bonds.

In general, the amount of flame-retarding additives will be in the range from 0.5 to 50, preferably from 3 to 25 and especially from 5 to 15, parts by weight per 100 parts by weight of copolyester. Smaller amounts of compounds which contain high concentrations of the elements responsible for flame retardation are sufficient, for example elementary red phosphorus is preferably used in an amount of 0.5 to 10 parts by weight per 100 parts by weight of copolyester whilst phosphorus in the form of triphenyl phosphate is used in amounts of 5 to 25 parts by weight of the phosphate per 100 parts by weight of copolyester. Halogenated aromatic compounds are employed in amounts of 2 to 20 parts by weight and substances having a synergistic action, for example organic or inorganic antimony compounds, such as antimony trioxide, are used in amounts of about 1 to 10 parts by weight per 100 parts by weight of copolyester.

Halogen-containing compounds which can be used include those of the formula

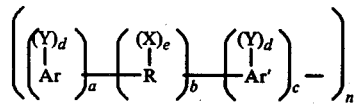

wherein
n an integer from 1 to 10 and
R is an alkylene, alkylidene or cycloaliphatic radical with 1 to 20 C atoms, for example methylene, ethylene, propylene, isopropylene, isopropylidene, butylene, isobutylene, amylene, cyclohexylene or cyclopentylidene, and
R can also denote an oxygen atom, a carbonyl group, a sulphur atom or a sulphur-containing group, such as a sulphoxide or sulphone group, or a carbonate group or a phosphorus-containing group,
R can also consist of two or more alkylene or alkylidene groups, which are linked together by groups such as aromatic radicals, oxygen atoms, ester groups or carbonyl groups, sulphur atoms, sulphoxide groups or sulphone groups or phosphorus-containing groupings, and finally, R can also be a dihydric phenol, such as bisphenol A, or a carbonate group,
Ar and Ar' are monocarbocyclic or polycarbocyclic aromatic groups, such as phenylene, biphenylene, terphenylene, naphthylene and the like,
Y denotes organic, inorganic or organo-metallic radicals and the substituents represented by Y comprise (1) halogen, such as chlorine, bromine, iodine or fluorine, or (2) hydroxyl or ether groups of the general formula OE,
wherein
E is a monovalent hydrocarbon radical, such as, for example, X, or (3) monovalent hydrocarbon radicals of the type represented by R, or (4) other substituents, such as nitro or cyano, the substituents mentioned being substantially inert and a proviso being that at least 1 and preferably 2 halogen atoms are present per aryl nucleus,
X is a monovalent hydrocarbon group with 1 to 20 C atoms and the following examples may be mentioned: alkyl, such as methyl, ethylene, propyl, isopropyl, butyl and decyl; aryl, such as phenyl, naphthyl, biphenyl, xylyl and tolyl; aralkyl, such as benzyl and ethylphenyl; and cycloaliphatic groups, such as cyclopentyl and cyclohexyl and when more than one grouping X is present, these groups can be identical or different,
the letter d in the above formula represents an integer from 1 up to the maximum equivalent of the number of replaceable hydrogens, which are bonded to the aromatic rings Ar or Ar',
the letter e represents 0 or an integer up to the maximum number of replaceable hydrogens on R, the letters a, b and c represent 0 or an integer, and if b is not 0, then neither a nor c can be 0, and otherwise either a or c but not both can be 0, whilst if b is 0, the aromatic radicals are linked together by a direct carbon-carbon bond.

The hydroxyl and Y substituents on the aromatic radicals Ar and Ar' can be in the ortho-, meta- or paraposition on the aromatic rings and the radicals can be linked to one another in any possible way.

The following examples of diaromatic compounds fall within the scope of the above formula: 2,2-bis-(3,5-dichlorophenyl)-propane, bis-(2-chlorophenyl)-methane, bis-(2,6-dibromophenyl)-methane, 1,1-bis-(4-iodophenyl)-ethane, 1,2-bis-(2,6-dichlorophenyl)-ethane, 1,1-bis-(2-chloro-4-iodophenyl)-ethane, 1,1-bis-(2-chloro-4-methylphenyl)-ethane, 1,1-bis-(3,5-dichlorophenyl)-ethane, 2,2-bis-(3-phenyl-4-bromophenyl)-ethane, 2,3-bis-(4,6-dichloronaphthyl)-propane, 2,2-bis-(2,6-dichlorophenyl)-pentane, 2,2-bis-(3,5-dichlorophenyl)-hexane, bis-(4-chlorophenyl)-phenylmethane, bis-(3,5-dichlorophenyl)cyclohexylmethane, bis-(3-nitro-4-bromophenyl)-methane, bis-(4-hydroxy-2,6-dichloro-3-methoxyphenyl)-methane, 2,2-bis-(3,5-dichloro-4-hydroxyphenyl)-propane and 2,2-bis-(3-bromo-4-hydroxyphenyl)-propane.

Substituted benzenes, such as, for example, tetrabromobenzene, hexachlorobenzene, and hexabromobenzene, and biphenyls, such as 2,2'-dichlorobiphenyl, 2,4'-dibromobiphenyl, 2,4'-dichlorobiphenyl, hexabromobiphenyl, octabromobiphenyl and decabromobiphenyl, and halogenated diphenyl ethers which contain 2 to 10 halogen atoms also fall within the scope of the above structural formula.

The preferred halogen compounds within the scope of this invention are aromatic halogen compounds, such as chlorinated benzene, brominated benzene, chlorinated biphenyl, chlorinated terphenyl, brominated biphenyl or brominated terphenyl or a compound which comprises two phenyl radicals, which are linked together by a divalent alkylene group, and carries at least two chlorine atoms or bromine atoms per phenyl nucleus.

Hexabromobenzene and brominated or chlorinated biphenyls or terphenyls, alone or as a mixture with antimony trioxide, are particularly preferred.

In general, the preferred phosphorus compounds are selected from elementary phosphorus or organic phosphonic acids, phosphonates, phosphinates, phosphonites, phosphinites, phosphene oxides, phosphenenes, phosphites or phosphates.

Triphenylphosphine oxide is an example of this category of compounds. It can be used either alone or as a mixture with hexabromobenzene or a chlorinated biphenyl and optionally antimony trioxide.

Typical preferred phosphorus compounds, which can be used within the scope of the present invention, are those of the formula

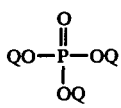

and their nitrogen analogues, wherein
Q represents identical or different radicals, including hydrocarbon radicals, such as alkyl, cycloalkyl, aryl, alkyl-substituted aryl and aryl-substituted alkyl; halogen, hydrogen or combinations thereof, with the proviso that at least one of the radicals Q is an aryl radical.

Typical examples of suitable phosphates comprise the following: phenyl bis-dodecyl phosphate, phenyl bis-neopentyl phosphate, phenyl ethylene hydrogen phosphate, phenyl-bis-(3,5,5'-trimethylhexyl)phosphate, ethyl diphenyl phosphate, 2-ethylhexyl di-(p-tolyl) phosphate, diphenyl hydrogen phosphate, bis-(2-ethylhexyl)-p-tolyl phosphate, tritolyl phosphate, bis-(2-ethylhexyl)-phenyl phosphate, tri-(nonylphenyl) phosphate, phenyl methyl hydrogen phosphate, di-(dodecyl)-p-tolyl phosphate, tricresyl phosphate, triphenyl phosphate, halogenated triphenyl phosphate, dibutyl phenyl phosphate, 2-chloroethyl diphenyl phosphate, p-tolyl bis-(2,5,5'-trimethylhexyl) phosphate and 2-ethylhexyl diphenyl phosphate.

Preferred phosphates are those in which each radical Q is of aromatic character. The most preferred phosphate is triphenyl phosphate. Triphenyl phosphate is also preferably employed in a combination with hexabromobenzene and optionally antimony trioxide.

Those compounds which contain phosphorus-nitrogen bonds, such as phosphonitrile chloride, phosphorus ester amides, phosphoric acid amides, phosphonic acid amides, phosphinic acid amides, tris-(aziridinyl)-phosphine oxide or tetrakis-(hydroxymethyl)-phosphonium chloride, can also be used as flame-retarding additives.

Particularly preferred flame-retarding additives are oligomers of a carbonate of a halogenated dihydric phenol. Of these oligomers, those which are preferred contain 2 to 20 recurrent units of the formula

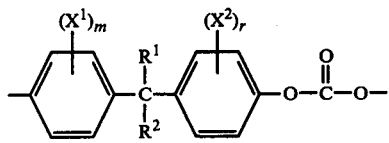

wherein
$R^1$ and $R^2$ are hydrogen, alkyl with 1 to 4 C atoms or phenyl,
$X^1$ and $X^2$ are bromine or chlorine and
m and r denote an integer from 1 to 4. These oligomeric additives have a low volatility when they are heated to temperatures above 200° C. and a softening point of less than about 300° C. They are employed alone or in combination with substances having a synergistic action such as inorganic or organic antimony compounds.

Up to 80, preferably 10 to 40, % by weight of reinforcing materials, based on the sum of copolyester reinforcing materials, can be added to the copolyesters according to the invention. Suitable reinforcing materials are fibres, whiskers or platelets of metals, for example aluminium, iron or nickel, and non-metals, for example ceramics, carbon filaments, silicates, asbestos, $TiO_2$ and titanate whiskers, quartz, glass flocks and preferably glass fibres.

Glass filaments made of calcium-aluminium-boron silicate glass, which is relatively free from sodium carbonate, are preferably used. Glass of this type is known as "E" glass; however, where the electrical properties of the reinforced copolyesters are not important, other glasses can also be used, for example the glass with a low sodium carbonate content which is known as "C" glass. The diameters of the filaments are in the range from about 0.003 to 0.018 mm, but this is not critical for the present invention.

The length of the glass filaments and whether they have been spun to give fibres and the fibres in turn have been bundled to give yarns, ropes or hanks or woven to give mats and the like is not critical for the invention. However, it is convenient to use fibre-like glass in the form of glass fibre staple about 3 to about 25 mm in length and preferably less than 6 mm in length for reinforcing the copolyesters according to the invention. On the other hand, even shorter pieces are found in molding produced from reinfored copolyesters according to the invention since considerable comminution takes place during mixing. It is, however, desirable that the lengths of the filaments are between about $1.25 \times 10^{-3}$ and about 3 mm.

Customary additives which can be used additionally in customary amounts are inert inorganic fillers, such as calcium carbonate, silicates, aluminas, lime and carbon, organic and inorganic pigments, dyestuffs, lubricants and release agents, UV absorbers and the like.

The rate of crystallization of the copolyesters according to the invention can be further increased by adding 0.01 to 1% by weight, relative to the unfilled and unreinforced copolyesters, of nucleating agents. Suitable nucleating agents are the compounds known to those skilled in the art, such as, for example, those described in Kunststoff-Handbach, (Plastics Handbook), Volume VIII, "Polyester", Carl Hanser Verlag, Munich 1973, page 701.

The copolyesters according to the invention can be molded at mold temperatures between 110 and 150° C., preferably at about 120° C., and at injection pressures of 740 kp/cm² and follow-up pressures of about 380 kp/cm² and, under these conditions, the cycle time can be considerably shorter (namely 30 to 35 seconds) than in the case of conventional polyethylene terephthalates containing nucleating agents. As already mentioned above, the rate of crystallization can be even further increased by adding nucleating agents.

The copolyesters according to the invention are excellent starting materials for the preparation of moldings of all types by injection molding.

The percentages quoted in the experiments which follow are % by weight.

EXAMPLES 1–3

97.1 g (0.5 mol) of dimethyl terephthalate are transesterified with 1.045 mols of ethylene glycol in the presence of 58 mg of zinc acetate for 2 hours at 200° C. and for 1 hour at 220° C. When trans-esterification is complete, 0.6 ml of GeO$_2$ solution (5% strength in ethylene glycol), 103 mg of triphenyl phosphate and the corresponding codiol are added. The temperature is raised to 250° C. in the course of one hour and, at the same time, the apparatus is evacuated (<1.0 mm Hg). Polycondensation is complete after a further 45-60 minutes. A clear viscous melt of the copolyester is obtained and on cooling this solidifies to a white crystalline mass.

Example 1 (Table) gives the properties of copolyesters similar to those of the invention, whilst Example 2 and 3 show the properties of copolyesters with codiol radicals which are not according to the invention.

cooling rate of 20° C./minute, sample weight: about 10 mg

The samples were characterized by their intrinsic viscosity and the thermodynamic data important for the melting and crystallization properties, such as enthalpy of melting ($\Delta H_m$), melting temperature ($T_m$), enthalpy of crystallization ($\Delta H_c$) and crystallization temperature ($T_c$).

At a constant rate of cooling and under otherwise identical experimental conditions, the rate of crystallization is higher the earlier the polymer crystallizes out, that is to say the super-cooling: $\Delta T = T_m - T_c$ indicates when the rate of crystallization reaches its maximum under the cooling conditions used.

Table

| Example | Ethylene glycol [mol %]** | Codiol | Amount of codiol [mol %]** | $[\eta]$ [dl/g] | $\Delta H_m$ [cal/g] | $T_m$ [°C] | $\Delta H_c$ [cal/g] | $T_c$ [°C] | $T_m$-$T_c$ [°C] |
|---|---|---|---|---|---|---|---|---|---|
| 1 | 95 | 2,2-diethyl-propane-1,3-diol | 5 | 0.55 | 10.4 | 246 | 10.4 | 201 | 45 |
| 2 | 95 | pentane-1,5-diol | 5 | 0.50 | 9.6 | 250 | 7.6 | 181 | 69 |
| 3 | 95 | 2-ethylpropane-1,3-diol | 5 | 0.52 | 9.8 | 251 | 7.2 | 178 | 73 |

*After a cooling phase of 20° C/minute, the samples crystallize again on 2nd heating.
**relative to the diol component In the Table:

$[\eta]$ denotes intrinsic viscosity in phenol/tetrachloroethane, 1:1, measured in a Ubbelohde capillary viscosimeter; polymer concentration: 0.6 g/dl, temperature: 25° C.
$\Delta H_m$ denotes enthalpy of melting
$T_m$ denotes melting temperature
$\Delta H_c$ denotes enthalpy of crystallization and
$T_c$ denotes crystallization temperature, measured with a DCS 2 (Perkin Elmer) at a heating and

We claim: Patent Claim:

1. Molded articles of highly crystalline, thermoplastic terephthalic acid copolyesters which crystallize rapidly and which consist of at least 90 mol %, relative to the dicarboxylic acid component, of terephthalic acid radicals, 95.2 to 99.5 mol %, relative to the diol component, of ethylene glycol radicals and 0.5 to 4.8 mol %, relative to the diol component, of 2.2-diethyl propane-1.3-diol radicals.

* * * * *